United States Patent

[11] 3,628,556

| [72] | Inventor | John D. Bachman<br>1300 Volunteer Parkway, Bristol, Tenn. |
| --- | --- | --- |
| [21] | Appl. No. | 877,669 |
| [22] | Filed | Nov. 18, 1969 |
| [45] | Patented | Dec. 21, 1971 |

[54] AUTOMATIC SPOOL VALVE
13 Claims, 10 Drawing Figs.

[52] U.S. Cl..................................................... 137/106,
91/308, 91/421
[51] Int. Cl..................................................... F15b 11/15
[50] Field of Search............................................ 137/102,
106; 91/308, 356, 421

[56] References Cited
UNITED STATES PATENTS

| 2,989,948 | 6/1961 | Forrester...................... | 91/421 X |
| --- | --- | --- | --- |
| 3,225,663 | 12/1965 | Pelisson....................... | 137/106 X |
| 3,385,166 | 5/1968 | Kroffke........................ | 91/308 X |

*Primary Examiner*—Robert G. Nilson
*Attorney*—Kimmel, Crowell & Weaver

ABSTRACT: The invention includes the automatic control and actuation of pneumatic four-way five-port pressure-actuated spool valves when used to control the cycling operation of double-acting air cylinders. A built-in two-way spring-loaded pressure-actuated valve functions to open and close a vent leading from the pilot chamber of the spool valves. Supply pressure constantly bleeds from the system supply to the pilot chamber and is vented to the atmosphere as long as the two-way valve is held open by residual pressure from exhaust side of the double-acting air cylinder. When residual pressure reaches zero, the two-way valve is closed by spring action and the pilot chamber becomes pressurized from system supply, thus shifting the spool of the spool valve. When the main spool is thus shifted, the previously pressurized side of the double-acting cylinder becomes the exhaust side and its residual pressure then opens the two-way valve venting the pilot chamber.

In a second form of the invention the system supply is bled into the pilot chamber of a second spool valve to provide sequence programming. A differentiating valve is provided to create a system supply pulse to the second spool valve, permitting it to be recycled while the original system supply pressure remains constant for a period.

INVENTOR
JOHN D. BACHMAN
BY
Kimmel Crowell & Weaver
ATTORNEYS

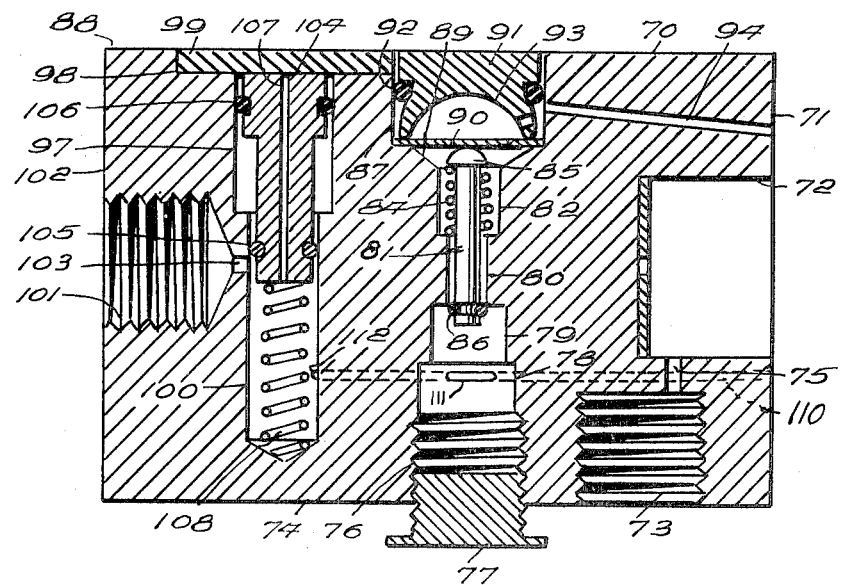
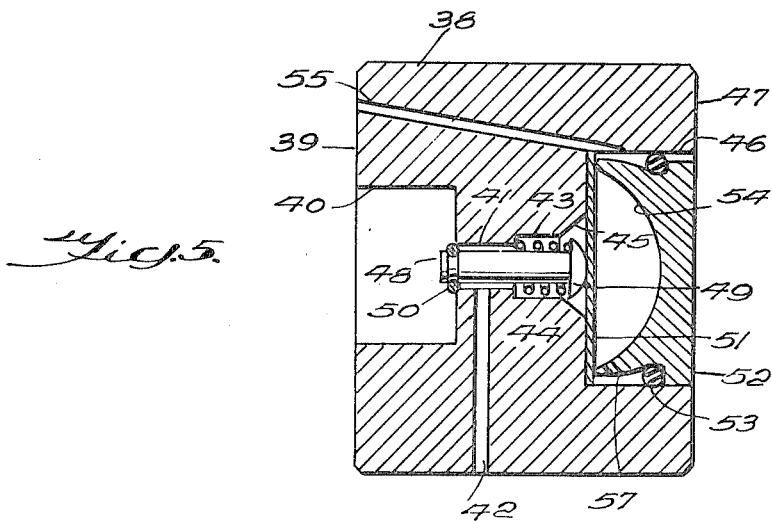

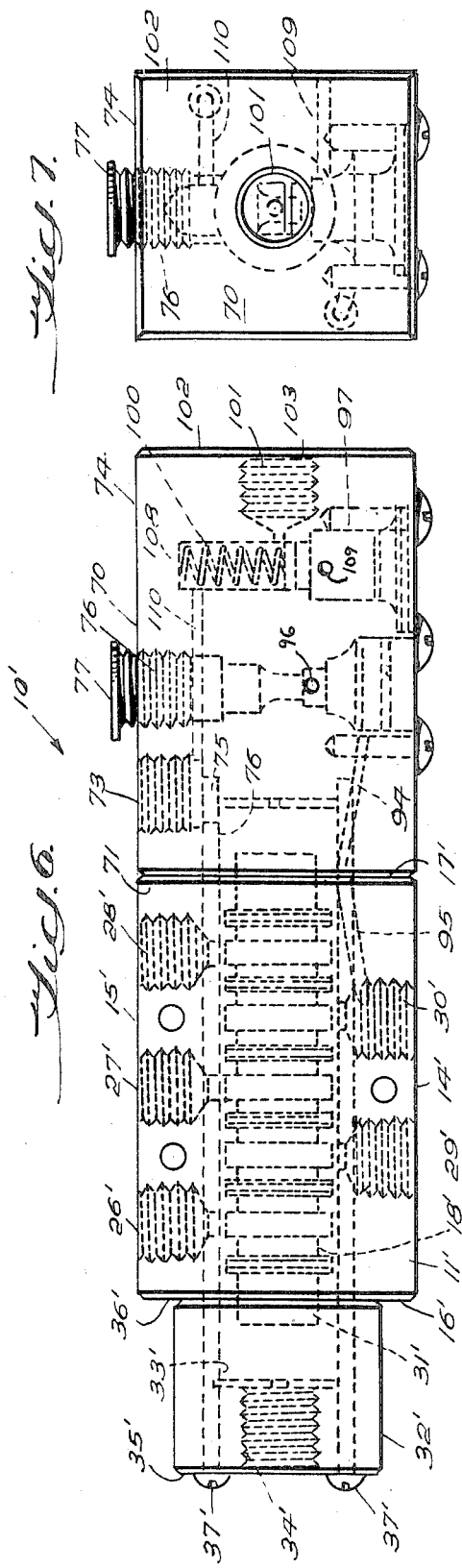

3,628,556

AUTOMATIC SPOOL VALVE

BACKGROUND OF THE INVENTION

Field of the Invention

The present invention relates to the control of spool valves of the type such as are used for cycling the flow of pressure fluids to opposite ends of the piston of a double-acting pneumatic cylinder causing the piston to move within the cylinder. The spool valve is moved backwards and forwards to change the direction of flow of the fluids by any number of means including hand-operated push rods, pneumatic pressure, hydraulic pressure, electromagnetic drives as well as any combination thereof. Automatic control of the spool valve position is used to automate the operation of the pneumatic cylinders.

Automated pneumatic cylinders are useful in a number of manufacturing operations wherein repeated motions are required at reasonably regular intervals.

SUMMARY OF THE INVENTION

The present invention is used with a conventional spool valve structure and includes a poppet valve which is sensitive to changes in pressure in the spool valve system and thereby causes the spool valve to shift from one end of its cylinder to the other in order to reverse the direction of flow of the pressure fluids therethrough. An additional valve cooperating with the control valve is used for actuating other spool valves working in conjunction with the initial spool valve.

BRIEF DESCRIPTION OF THE DRAWINGS

FIG. 5 is a longitudinal vertical sectional view taken along the line 5—5 of FIG. 1, looking in the direction of the arrows;

FIG. 6 is a top plan view of a modified form of the invention;

FIG. 7 is an end elevation of the structure illustrated in FIG. 6;

FIG. 8 is a front elevation of the structure illustrated in FIG. 6;

FIG. 9 is an end elevation of the structure illustrated in FIG. 6 of the end opposite to that of FIG. 7; and FIG. 10 is longitudinal vertical cross section taken along the line 10—10 of FIG. 8, looking in the direction of the arrows.

DESCRIPTION OF THE PREFERRED EMBODIMENTS

Figure 2:
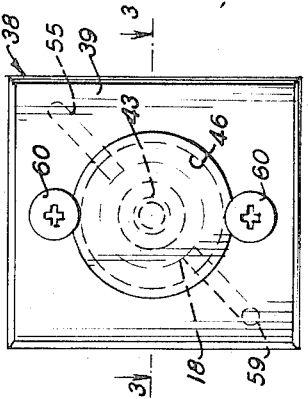
FIG. 2 is an end elevation of the invention.
Figure 4:
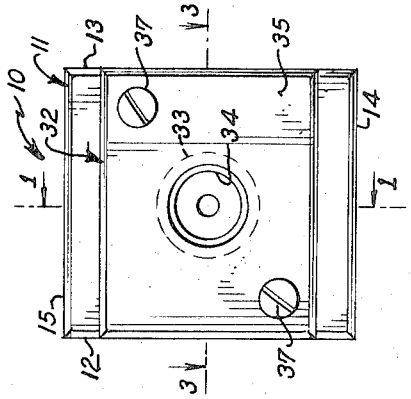
FIG. 4 is an end elevation of the invention illustrating the end opposite to FIG. 2.
Figure 3:
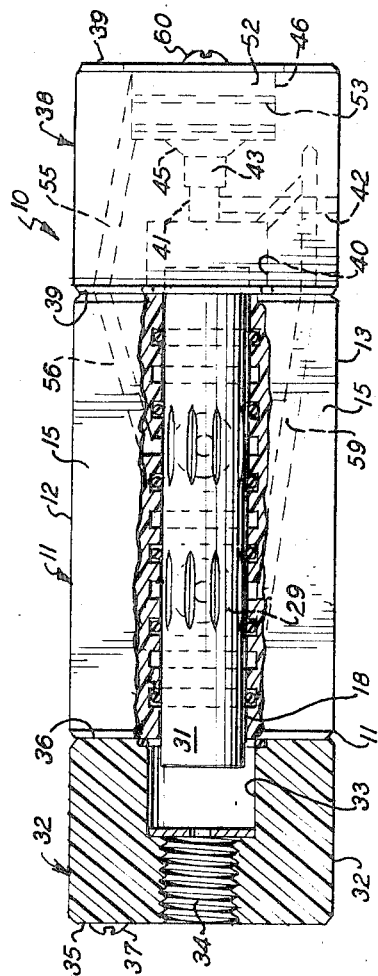
FIG. 3 is a front elevation partially in cross section and partially broken away of the invention.
Figure 1:
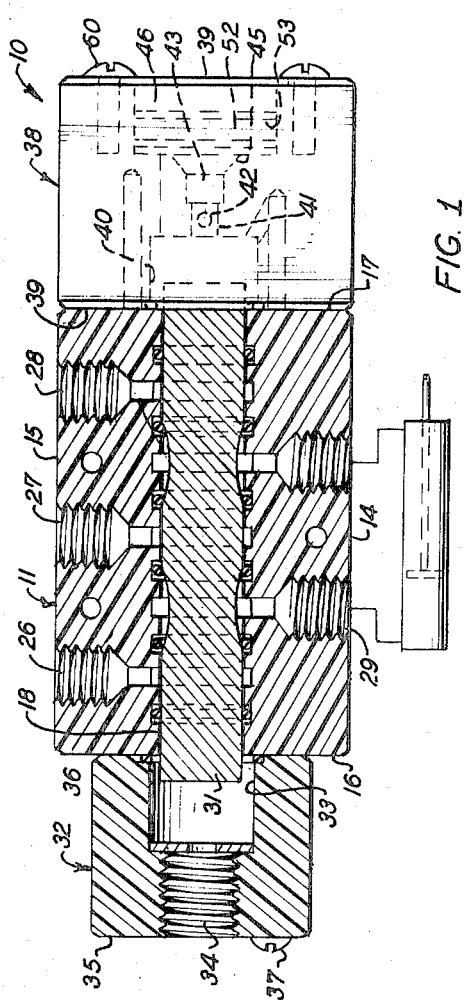
FIG. 1 is a top plan view partially in cross section of the invention.

Referring now to the drawings in detail wherein like reference characters indicate like parts throughout the several FIGS. and particularly to FIGS. 1 through 5, the reference numeral 10 indicates generally an automatic spool valve system constructed in accordance with the invention.

The spool valve system 10 includes a generally rectangular body 11 having opposite side faces 12, 13, a bottom face 14, and a top face 15. The body 11 is also provided with an end face 16 and a second end face 17.

A relatively large bore 18 extends longitudinally through the body 11 from the end face 16 to the end face 17. A threaded bore 26 opens through the top surface 15 and communicates with the bore 18. A second threaded bore 27 opens through the top surface 15 and also communicates with the bore 18. A third threaded bore 28 opens through the top surface 15 and also communicates with the bore 18. A fourth threaded bore 29 opens through the bottom surface 14 and communicates with the bore 18. A fifth threaded bore 30 opens through the bottom surface 14 and communicates with the bore 18. A spool 31 is mounted for longitudinal reciprocation in the bore 18 and is sealed therein. The spool 31 is conventionally provided with longitudinally extending grooves (not shown) formed in the surface thereof to communicate in one position of the spool, the bore 26 with the bore 29, and the bore 27 with the bore 30. In the opposite position of the spool 31 it communicates the bore 27 with the bore 29 and the bore 28 with the bore 30. The bore 27 is connected to a supply of air under pressure and the bores 26, 28 are vented to the atmosphere. The bores 29, 30 are connected to opposite ends of, for example, a double-acting pneumatic cylinder so as to move the piston and piston rod thereof in one direction with the spool 31 at one end of the bore 18 and to move the piston and piston rod thereof in the opposite direction when the spool 31 is at the opposite end of the bore 18. Obviously as the piston in the pneumatic cylinder moves back and forth pressure fluid is pushing against one end of the piston while fluid from the opposite end is being moved outwardly through the spool valve to exhaust.

A block 32 of generally rectangular form has a bore 33 opening into one end thereof of a diameter greater than the bore 18 to freely receive the spool 31 as it moves in the direction of the block 32. A threaded inlet bore 34 extends coaxially with the bore 33 and opens through the end wall 35 of the block 32. The block 32 has a second end wall 36 at its opposite end parallel to the end wall 35 which engages the end wall 16 with the bores 33, 18 in aligned relation. The block 32 is secured to the body 11 by bolts 37 extending longitudinally therein.

A block 38 has an end face 39 which engages the end face 17 of the body 11 and the block 38 is secured to the body 11 by the bolts 37. A bore 40 opens into the block 38 through the end face 39 and has a diameter greater than and is aligned with the bore 18 of the body 11. The bore 40 forms a pilot chamber in the block 38 and has a valve bore 41 extending axially inwardly from the bore 40. A bleed vent 42 extends through the side of the block 38 and communicates with the bore 41 at its inner end. A bore 43 extends inwardly from the bore 41 and has a diameter slightly larger than the bore 41 to receive a coiled spring 44 as can be seen in FIG. 5. A flared opening 45 connects the bore 43 with a relatively large bore 46 extending axially therefrom and opening through the end face 47 of the block 38 which is parallel to and spaced from the end face 39 thereof. A poppet valve 48 is positioned in the bores 41, 43 and has a head 49 at one end an a valve-forming O-ring 50 at the opposite end. A rubber diaphragm 51 is positioned in the bottom of the bore 46 in engagement with the head 49 of the valve 48 and has a diameter equal to that of the bore 46. A plug 52 having an O-ring seal 53 about its circumference is provided with a concave inner face 54 and engages peripherally the diaphragm 51 to secure it in the bottom of the bore 46. The O-ring seal 53 seals the plug 52 to the bore 46 to prevent the escape of air thereabout. A bore 55 extends from the side of the bore 46 to the face 39 and connects with a bore 56 in the body 11 which extends to and communicates with the bore 30 in the body 11. A port 57 opens through the inner edge portion of the plug 52 to permit a flow from the bore 55 to reach the side of the diaphragm 51 opposite the valve 48. Pressure on the diaphragm 51 pushes the diaphragm 51 against the head 49 so as to move the valve 48 axially away from the plug 52 and unseal the O-ring 50 from the end of the bore 41 to permit air in the pilot chamber 40 to flow outwardly through the bore 42 to vent the pilot chamber 40. A bore 58 extends from the pilot chamber 40 and communicates with a bore 59 in the body 11 which in turn communicates with the bore 29 therein. The plug 52 is secured in the bore 46 by a pair of capscrews 60 extending into the block 38.

In the use and operation of the device illustrated in FIGS. 1 through 5, the bore 34 is connected to signal pressure and the bore 27 is connected to a source of pressure sufficient to operate the double-acting pneumatic cylinders (not shown). With pressure on bore 27 and the spool 31 in its unactuated position extending completely into the bore 33 at the left end of the device, bore 30 is pressurized and bore 29 is connected to the exhaust bore 26. The bore 56 and the bore 55 connected to the bore 30 bring pressure to the upper side of the diaphragm 51 pushing the poppet valve 48 open to thus vent the pilot chamber 40 to the atmosphere through the vent 42 as explained above. Signal pressure through the bore 34 then moves the spool 31 to its opposite end connecting the pressure bore 27 to the bore 29 and the exhaust bore 28 to the bore 30. Upon the completion of the stroke of the cylinder, the exhaust pressure in the bore 30 will reach zero, thus relieving the pressure on the diaphragm 51 and permitting the poppet valve 48 to close sealing off the vent 42. Pressure from the bore 29 will then pass through bores 59 and 58 to the pilot chamber 40 and build pressure in the pilot chamber 40 sufficient to move the spool 31 to the opposite end of the bore 18 to complete the cycle. A flow restrictor F in the bore 58 limits the bleed flow through the bore 58.

While with the assembly described above a single cycle is provided each time the signal pressure is applied through bore 34, it should be understood that a duplicate of block 38 can be attached to the face 16 in place of the block 32 to provide a continuous cycling of the spool 31.

Referring now to FIGS. 6 through 10, a modified form of the invention is illustrated wherein an automatic spool valve system is indicated generally at 10'.

The spool valve system 10' includes a generally rectangular body 11' having opposite side faces 12', 13', a bottom face 14', and a top face 15'. The body 11' is also provided with an end face 16' and a second end face 17'.

A relatively large bore 18' extends longitudinally through the body 11' from the end face 16' to the end face 17'. A threaded bore 26' opens through the top surface 15' and also communicates with the bore 18'. A second threaded bore 27' opens through the top surface 15' and also communicates with the bore 18'. A third threaded bore 28' opens through the top surface 15' and also communicates with the bore 18'. A fourth threaded bore 20' opens through the bottom surface 14' and communicates with the bore 18'. A fifth threaded bore 30' opens through the bottom surface 14' and communicates with the bore 18'. A spool 31' is mounted for longitudinal reciprocation in the bore 18' and is sealed therein. The spool 31' is conventionally provided with longitudinally extending grooves (not shown) formed in the surface thereof to communicate in one position of the spool, the bore 26' with the bore 29', and the bore 27' with the bore 30'. In the opposite position of the spool 31' it communicates the bore 27' with the bore 29' and the bore 28' with the bore 30'. The bore 27' is connected to a supply of air under pressure and the bores 26', 28' are vented to the atmosphere. The bores 29', 30' are connected to opposite ends of, for example, a double-acting pneumatic cylinder so as to move the piston and piston rod thereof in one direction with the spool 31' at one end of the bore 18' and to move the piston and piston rod thereof in the opposite direction when the spool 31' is at the opposite end of the bore 18'. Obviously as the piston in the cylinder moves back and forth air is pushing against one end of the piston while air from the opposite end is being moved outwardly through the spool valve to exhaust.

A block 32' of generally rectangular form has a bore 33' opening into one end thereof of a diameter greater than the bore 18' to receive the spool 31' as it moves in the direction of the block 32'. A threaded bore 34' extends coaxially with the bore 33' and opens through the end wall 35' of the block 32'. The block 32' has a second end wall 36' at its opposite end parallel to the end wall 35' which engages the end wall 16' with the bores 33', 18' in aligned relation. The block 32' is secured to the body 11' by bolts 37' extending longitudinally therein.

A block 70 is provided with an end face 71 which engages against the end face 17' of the body 11' and is secured thereto by the bolts 37' which extend through the block 32' and the body 11'. The block 70 has a bore 72 which opens through the end face 71 in axial alignment with the bore 18'. A threaded signal pressure bore 73 opens through a side face 74 of the block 70 and has a bore 75 communicating it with the bore 72.

A threaded bore 76 opens through the side face 74 adjacent the threaded bore 73 and has a plug 77 closing its access to the atmosphere. A bore 78 extends axially inwardly from the threaded bore 76 and has a counterbore 79 extending axially inwardly therefrom. A valve bore 80 extends axially inwardly from the counterbore 78 to receive a valve 81 extending therethrough. A spring bore 82 extends axially inwardly from the valve bore 80 to receive a coil spring 84 which surrounds the valve 81 and engages against a head 85 at the upper end of the valve 81. A valve-forming O-ring 86 is secured to the lower end of the valve 81 to engage and seal against the lower end of the valve bore 80. A bore 87 opens inwardly from the face 88 of the body 70 with the face 88 arranged parallel to and spaced from the face 74. A tapered opening 89 connects the inner end of the bore 87 with the inner end of the bore 80 as can be seen in FIG. 10. A flexible diaphragm 90 having a diameter equal to the bore 87 is positioned in the inner end of the bore 87 in engagement with the head 85 of the valve 81. A plug 91 of generally cylindrical form has an O-ring seal 92 engaged annularly therabout. The plug 91 has a concave hollow 93 formed at its inner end and the plug 91 engages the peripheral edges of the diaphragm 90 to secure and seal its edges. A bore 94 extends from the bore 87 to the face 71 where it connects with a bore 95 in the body 11' which connects to the threaded bore 30'.

Pressure from the threaded bore 30' through the bores 95, 94 acts on the upper side of the diaphragm 90 and moves the poppet valve 81 downwardly so that the O-ring 86 unseals from the bottom of the bore 80 and vents the bores 76, 78, 80 to the atmosphere through a vent 96 which extends from the bore 80 through the sidewall of the block 70.

A bore 97 extends into the block 70 through the face 88 and is countersunk at 98 to receive a cap 99. A counterbore 100 opens axially inwardly from the bottom of the bore 97 and has a diameter somewhat less than the bore 97. A threaded bore 101 opens through the end wall 102 of the block 70 and has a port 103 which communicates the inner end of the bore 101 with the bore 100. A differential piston 104 is mounted in the bores 97, 100 and has an O-ring 105 on its inner end which engages in sealing relation the bore 100 and a somewhat larger O-ring 106 on its outer end which engages and seals with the bore 97. The differential piston 104 has an axial bore 107 opening completely therethrough for reasons to be assigned. A coil spring 108 is seated in the bottom of the bore 100 and engages the lower end of the differential piston 104 to normally maintain the piston 104 in its outermost position with the O-ring 105 positioned between the port 103 and the bore 97. A vent 109 extends from the bore 97 through the side of the block 70 communicating the bore 97 to the atmosphere. The vent 109 is positioned closely adjacent the connection between the bore 97 and the bore 100 and the O-ring 105 and the O-ring 106 will always remain on opposite sides of the vent 109.

A bore 110 extends inwardly from the end face 71 of the block 70 intersecting the bore 78 at 111 and terminating in the bore 100 at 112. The point 112 where the bore 110 intersects the bore 100 is sufficiently close to the inner end of the bore 100 so that the O-ring seal 105 always lies between the point 112 and the bore 97.

The bore 110 having a bleed flow restrictor (not shown), opens through the side face 71 of the block 70 and communicates with a bore 113 in the body 11' which extends to and communicates with with the threaded bore 29'.

In the use and operation of the invention illustrated in FIGS. 6 through 10 when the spool 31' is at the left end of its travel so that pressure from the source of air under pressure fed to the threaded bore 27' communicates with the threaded bore 30' while simultaneously the threaded bore 26' is connected to the threaded bore 29' is to provide an exhaust connection from the air cylinder (not shown). A signal pressure is then applied to the left end of the spool 31' through the threaded bore 34' thus moving the spool 31' to the right end of the bore 18 as viewed in FIG. 6. The movement of the spool 31' to its new position then connects the source of air pressure applied through threaded bore 27' to the third bore 29' while simultaneously the threaded bore 28' is connected to the threaded bore 30' to provide an exhaust outlet from the air cylinder (not shown). Pressure from the threaded bore 29' feeds through the bore 113 and the bore 110 to supply pressure to the bore 80 and the bore 100 as can be seen in FIG. 10. The poppet valve 81 is held open by pressure on the diaphragm 90 flowing from the threaded bore 34' through the bores 95, 94. This pressure is the exhaust pressure from the air cylinder. At the end of the cylinder stroke pressure on the diaphragm 90 reaches zero and the poppet valve 81 closes and a supply pressure from threaded bore 29' can no longer vent through vent 96. With the differential piston 104 in its outermost position as illustrated in FIG. 10, the supply pressure then passes through the bore 103 into the threaded bore 101 where it can be used as a control pressure to actuate any other valve or device or can be connected to the threaded bore 73 to actuate the spool 31' and return it to its original starting position.

When the pressure flowing to and through the threaded bore 101 is used to actuate a separate valve, the pressure in the bore 100 will rise to the pressure level of the supply and passing through the bore 107 of the differential piston 104 will operate on the larger diameter O-ring 106 and move the differential piston 104 downwardly so that the O-ring 105 moves below the port 103 shutting off the supply pressure from the bore 101 and simultaneously venting the bore 101 through the vent 109. The differential piston 104 thus acts as an impulse valve or differentiator to thus void the signal given to a subsequently operated valve so that this valve can be recycled when desired. Thus any number of the units 10' may be connected to each other in any desired sequencing arrangement without the use of limit switches or additional valves. While as illustrated in FIGS. 6 through 10 only one block 70 is connected to the body 11' it should be understood that a second block 70 and its associated valves may be operatively connected to the opposite end of the body 11'

Having thus described the preferred embodiments of the invention, it should be understood that numerous structural modifications and adaptations may be resorted to without departing from the spirit of the invention.

What is claimed is:

1. An automatic spool valve for alternately supplying pressure fluid to the opposite ends of a double-acting power cylinder, said automatic spool valve comprising a valve body having a longitudinal bore and plural spaced transverse bores in communication with the longitudinal bore, one transverse bore receiving supply pressure fluid, a first pair of said transverse bores delivering fluid selectively to opposite ends of said power cylinder, a second pair of said transverse bores selectively venting to atmosphere exhaust pressure from the ends of the power cylinder, a valve spool reciprocably mounted in said longitudinal bore and shiftable between first and second operating positions, means forming a first pilot chamber at one end of the valve body adapted to receive a signal pressure and communicating with the longitudinal bore, means forming a second pilot chamber at the other end of the valve body communicating with the longitudinal bore, the last-named means including a passage for venting the second pilot chamber to atmosphere, a biased-closed check valve in said venting passage, means including a passage leading from one of said first pair of transverse bores connected with and delivering supply pressure to said check valve and maintaining the check valve normally open when said spool is in said first operating position, and another passage means interconnecting the other of said first pair of said transverse bores with the second pilot chamber to deliver exhaust pressure from the power cylinder to the second pilot chamber when said spool is in said first operating position, whereby signal pressure in the first pilot chamber shifting the spool valve from its first to its second operating position causes supply pressure to be delivered to the second pilot chamber through said another passage means and exhaust pressure to be delivered to said means including said passage, so that upon completion of the power cylinder stroke zero exhaust pressure is sensed by said means, allowing the biased check valve to close and permitting supply pressure to build up in said second pilot chamber to thereby return the spool to its first operating position.

2. An automatic spool valve according to claim 1, wherein said means forming a first pilot chamber comprises a first block detachably secured to said one end of the valve body and containing said first pilot chamber, said block adapted for connection with a signal pressure source, said means forming a second pilot chamber comprising a second block detachably secured to the other end of the valve body.

3. An automatic spool valve according to claim 1, and said means including a passage comprising a movable operating element for said check valve engaging the check valve and opposing the biasing force on the check valve, said element responding to supply pressure to maintain the check valve normally open.

4. An automatic spool valve according to claim 3, and said operating element comprising a flexible diaphragm, and additional means forming a fluid chamber on the side of said diaphragm remote from said check valve.

5. An automatic spool valve according to claim 4, and said check valve comprising a spring-urged poppet valve extending axially of the second pilot chamber and diaphragm.

6. An automatic spool valve according to claim 5, and a sealing element on the poppet valve positioned to block communication between the second pilot chamber and said passage for venting the second pilot chamber when the poppet valve is closed.

7. An automatic spool valve for alternatively supplying pressure fluid to the opposite ends of a double-acting power cylinder comprising a valve body having a longitudinal bore and plural spaced transverse bores communicating with the longitudinal bore, one transverse bore receiving supply pressure fluid, a first pair of said transverse bores delivering fluid selectively to opposite ends of said power cylinder, a second pair of said transverse bores selectively venting to atmosphere exhaust pressure from the ends of the power cylinder, a valve spool reciprocably mounted in said longitudinal bore and shiftable between first and second operating positions, means communicating with one end of the longitudinal bore to deliver a signal pressure thereto, means including a vent passage and a biased-closed check valve in the vent passage communicating with the other end of said longitudinal bore, means including a passage leading from one of said first pair of transverse bores connected with and delivering supply pressure to said check valve to maintain the check valve normally open when said spool is in said first operating position, and another passage means interconnecting the other of said first pair of transverse bores with said vent passage containing said check valve to deliver exhaust pressure from the power cylinder thereto when said spool is in said first operating position, shifting of said spool to said second operating position in response to said signal pressure at said one end of the longitudinal bore causing supply pressure to be delivered to said vent passage containing said check valve and exhaust pressure to be delivered to said means connected with said check valve, so that upon completion of the power cylinder stroke zero exhaust pressure is sensed by said means connected with said check valve allowing the biased check valve to close and permitting supply pressure to build up in said vent passage containing said check valve.

8. An automatic spool valve according to claim 7, and an impulse valve device having a connection with said another passage means and having a vent to the atmosphere and having a connection for another working device in communication with said impulse valve device.

9. An automatic spool valve according to claim 8, and said impulse valve device comprising a differential piston, a stepped bore receiving said piston, a spring within said bore opposing said differential piston in one direction, said stepped bore communicating with said another passage means.

10. An automatic spool valve for alternately supplying fluid under pressure to the opposite ends of a double-acting power cylinder comprising a valve body having first and second end faces, a bore extending longitudinally therethrough, a plurality of transverse bores communicating with said longitudinal bore, a first one of said transverse bores being adapted to be connected to a fluid pressure supply, a spool mounted for reciprocation in said longitudinal bore and adapted to reciprocate between a first position and a second position for selectively communicating pairs of said transverse bores for supplying fluid to and exhausting fluid from said power cylinder, means connecting said pairs of transverse bores with opposite ends of said power cylinder, passage means connecting one end of said longitudinal bore with a source of signal pressure for moving said valve spool from its said first position to its said second position, a block detachably secured to said second end face of said valve body and having a first bore and a second bore, said first bore comprising spaced apart first and second chambers connected by a valve bore, a vent passage connecting said valve bore to atmosphere, a poppet valve disposed in said valve bore, means separating said first chamber from said valve bore and said second chamber to prevent fluid flow therebetween, biasing means biasing said poppet valve toward closed position to prevent communication between said second chamber and said valve bore, said second bore including an enlarged portion and a reduced counterbore portion, a vent passage connecting said enlarged portion of said second bore to atmosphere, a signal-conducting passage connecting said reduced counterbore portion to a device to be actuated, a differential piston having an enlarged end and a reduced end in said second bore for cancelling signals sent through said signal conducting passage, the enlarged end of said piston being disposed in said enlarged portion of said second bore and the reduced end of said piston being disposed in said counterbore portion of said second bore, said differential piston having a longitudinally extending bore therethrough, sealing means circumferentially disposed on the enlarged end of said differential piston and sealing means circumferentially disposed on the reduced end of said differential piston, biasing means in said counterbore portion for normally holding said differential piston in a first position, a first pressure-conducting bore connected to a second one of said transverse bores for effecting passage of supply fluid to said first chamber in said first bore in said block for maintaining said poppet valve in an open position when said spool is in its first position, a second pressure-conducting bore connected to a third one of said transverse bores for effecting passage of exhaust fluid from said power cylinder to said second chamber in said block when said spool is in its said first position, said fluid passing to atmosphere through said vent passage in said valve bore, a third pressure-conducting bore extending between and connecting said second chamber in said block with said counterbore portion of said second bore in said block, whereby upon application of pressure from said signal pressure source said spool will be moved from its said first position to its said second position to connect said third one of said transverse bores with said first chamber of said first bore in said block through said first pressure-conducting bore to carry exhaust fluid from said power cylinder to said first chamber and connecting said second one of said transverse bores with said second chamber of said first bore in said block through said second pressure-conducting bore to carry supply fluid to said second chamber, said poppet valve closing when zero pressure is reached in said exhaust fluid to prevent venting to atmosphere of supply fluid in said second chamber through vent passage, said supply fluid then passing through said third pressure-condcuting bore into said counterbore portion of said second bore and through said signal-conducting passage to actuate the device to be actuated, said supply fluid passing through said longitudinal bore in said differential piston when full fluid pressure is built up in said signal conducting passage and said counterbore portion to move said differential piston from its said first to its said second position to permit said supply fluid in said signal-condcuting passage to be vented to atmosphere through said vent passage in said enlarged portion of said second bore to cancel said signal.

11. The automatic spool valve in accordance with claim 10 wherein said block further includes a pilot chamber communicating with said longitudinal bore of said valve body, and passage means in communication with said pilot chamber adapted to be connected to and in communication with said signal conducting passage.

12. An automatic spool valve for alternately supplying fluid under pressure to the opposite ends of a double-acting power cylinder comprising a valve body having first and second end faces, a bore extending longitudinally therethrough, a plurality of transverse bores communicating with said longitudinal bore, a first one of said transverse bores being adapted to be connected to a fluid pressure supply, a spool mounted for reciprocation in said longitudinal bore and adapted to reciprocate between a first position and a second position for selectively communicating pairs of said transverse bores for supplying fluid to and exhausting fluid from said power cylinder, means connecting said pairs of transverse bores with opposite ends of said power cylinder, passage means connecting one end of said longitudinal bore with a source of signal pressure for moving said valve spool from its said first position to its said second position, a block detachably secured to said second end face of said valve body and having a first bore and a second bore, said first bore comprising spaced apart first and second chambers connected by a valve bore, a vent passage connecting said valve bore to atmosphere, a poppet valve disposed in said valve bore, means separating said first chamber from said valve bore and second chamber to prevent fluid flow therebetween, biasing means biasing said poppet valve toward closed position to prevent communication between said second chamber and said valve bore, a first pressure-conducting bore connected to a second one of said transverse bores for effecting passage of supply fluid to said first chamber in said first bore in said block for maintaining said poppet valve in an open position when said spool is in its first position, a second pressure-conducting bore connected to a third one of said transverse bores for effecting passage of exhaust fluid from said power cylinder to said second chamber in said block when said spool is in its said first position, said fluid passing to atmosphere through said vent passage in said valve bore, a third pressure-conducting bore extending between and connecting said second chamber in said block with said second bore in said block, a signal-conducting passage connecting said second bore to a device to be actuated, a vent passage in said second bore connecting said bore to atmosphere, a differential piston mounted for reciprocation in said second bore, pressure transfer passage means carrying fluid pressure to operate said differential piston to connect said signal-conducting passage with said vent passage for cancelling said signal pressure.

13. An automatic spool valve for alternately supplying fluid under pressure to the opposite ends of the double-acting power cylinder comprising a valve body having first and second end faces, a bore extending longitudinally therethrough, a plurality of transverse bores communicating with said longitudinal bore, a first one of said transverse bores being adapted to be connected to a fluid pressure supply, a spool mounted for reciprocation in said longitudinal bore and adapted to reciprocate between a first position and a second position for selectively communicating pairs of said transverse bores for supplying fluid to and exhausting fluid from said power cylinder, a first block detachably secured to said first end face of said valve body, said first block having a pilot chamber communicating with said longitudinal bore, a second block detachably secured to said second end face of said valve body and having a first bore and a second bore, said first bore comprising spaced apart first and second chambers connected by a valve bore, a vent passage connecting said valve bore to atmosphere, a poppet valve disposed in said valve bore, biasing means biasing said poppet valve toward closed position to prevent communication between said second chamber and said valve bore, said second bore including an enlarged portion and a reduced counterbore portion, a vent passage connecting said enlarged portion of said second bore to atmosphere, a signal-conducting passage connecting said reduced counterbore portion to a device to be actuated, a differential piston having an enlarged end and a reduced end in said second bore for cancelling signals sent through said signal conducting passage, the enlarged end of said piston being disposed in said enlarged portion of said second bore and the reduced end of said piston being disposed in said counterbore portion of said second bore, said differential piston having a longitudinally extending bore therethrough, sealing means circumferentially disposed on the enlarged end of said differential piston and sealing means circumferentially disposed on the reduced end of said differential piston, biasing means in said counterbore portion for normally holding said differential piston in a first position, a first pressure-conducting bore connected to a second one of said transverse bores for effecting passage of supply fluid to said first chamber in said first bore in said second block for maintaining said poppet valve in an open position when said spool is in its first position, a second pressure-conducting bore connected to a third one of said transverse bores for effecting passage of exhaust fluid from said power cylinder to said second chamber in said second block when said spool is in its said first position, said fluid passing to atmosphere through said vent passage in said valve bore, a third pressure-conducting bore extending between and connecting said second chamber in said second block with said counterbore portion of said second bore in said second block, whereby upon application of signal pressure to said pilot chamber in said first block said spool will be moved from its said first position to its said second position to connect said third one of said transverse bores with said first chamber of said first bore in said second block through said first pressure-conducting bore to carry exhaust fluid from said power cylinder to said first chamber and connecting said second one of said transverse bores with said second chamber of said first bore in said second block through said second pressure conducting bore to carry supply fluid to said second chamber, said poppet valve closing when zero pressure is reached in said exhaust fluid to prevent venting to atmosphere of supply fluid in said second chamber through vent passage, said supply fluid then passing through said third pressure-conducting bore into said counterbore portion of said second bore and through said signal-conducting passage to actuate the device to be actuated, said supply fluid passing through said longitudinal bore in said differential piston when full fluid pressure is built up in said signal-conducting passage and said counterbore portion to move said differential piston from its said first to its said second position to permit said supply fluid in said signal-conducting passage to be vented to atmosphere through said vent passage in said enlarged portion of said second bore to cancel said signal.

* * * * *